US010042933B2

(12) United States Patent
Johl et al.

(10) Patent No.: US 10,042,933 B2
(45) Date of Patent: Aug. 7, 2018

(54) DEEP LINKING TO APPLICATION OBJECTS

(71) Applicant: Oracle International Corporation, Redwood Shores, CA (US)

(72) Inventors: Paul Johl, Centennial, WY (US); George Kellner, San Mateo, CA (US); Mohan Arthur, San Ramon, CA (US); Deena Philip, Sunnyvale, CA (US); Anuranjana Nambiar, Hayward, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 330 days.

(21) Appl. No.: 14/996,625

(22) Filed: Jan. 15, 2016

(65) Prior Publication Data
US 2017/0004209 A1  Jan. 5, 2017

Related U.S. Application Data

(60) Provisional application No. 62/188,064, filed on Jul. 2, 2015.

(51) Int. Cl.
*G06F 17/30* (2006.01)
*H04L 29/08* (2006.01)

(52) U.S. Cl.
CPC .. *G06F 17/30864* (2013.01); *G06F 17/30887* (2013.01); *H04L 67/1097* (2013.01)

(58) Field of Classification Search
None
See application file for complete search history.

(56) References Cited

U.S. PATENT DOCUMENTS

| 5,787,440 | A | 7/1998 | Bakke et al. |
| 7,526,730 | B1 * | 4/2009 | Cahill ............... G06F 17/30905 715/738 |
| 7,698,269 | B2 | 4/2010 | Zhou et al. |
| 7,873,537 | B2 | 1/2011 | McQueeney et al. |
| 8,185,603 | B2 | 5/2012 | Hansen et al. |
| 8,209,615 | B2 | 6/2012 | Gupta et al. |

(Continued)

FOREIGN PATENT DOCUMENTS

WO  2007/096603 A2  8/2007

OTHER PUBLICATIONS

Mike; "URL Structure"; https://thoughtsonsalesforce.com/index.php?option=com_mojo&Itemid=20&p=40; "URL Structure"; Oct. 2, 2006.

(Continued)

*Primary Examiner* — Hung Le
(74) *Attorney, Agent, or Firm* — Potomac Law Group, PLLC (57) ABSTRACT

A system that directs a user to an object in response to a selection of a deep link uniform resource identifier ("URL") that includes an identity of a web service, an object type and action, accesses a database table. The system uses the object type and the action as a first index key and a second index key of the database table to generate a query. In response to the query, the system retrieves additional parameters to append to the deep link URL to generate a full URL. The system then directs the user to the object that corresponds to the full URL.

20 Claims, 7 Drawing Sheets

(56) References Cited

U.S. PATENT DOCUMENTS

| | | | |
|---|---|---|---|
| 8,510,764 B1* | 8/2013 | Deselaers | G06F 9/485 719/329 |
| 9,477,644 B1* | 10/2016 | Oertel | G06F 17/3089 |
| 9,594,477 B1* | 3/2017 | Ardakani | G06F 3/0484 |
| 9,633,378 B1* | 4/2017 | Nath | G06Q 30/0277 |
| 2007/0209080 A1* | 9/2007 | Ture | G06F 17/30864 726/28 |
| 2012/0136764 A1* | 5/2012 | Miller | G06Q 40/123 705/31 |
| 2012/0179955 A1 | 7/2012 | French et al. | |
| 2013/0110815 A1* | 5/2013 | Tankovich | G06F 17/30887 707/711 |
| 2014/0075292 A1* | 3/2014 | Chakra | G06F 17/2264 715/235 |
| 2014/0108373 A1* | 4/2014 | Abrahami | G06F 17/30893 707/706 |
| 2015/0039906 A1 | 2/2015 | Kolesnik | |
| 2015/0149621 A1* | 5/2015 | Butler | H04L 67/22 709/224 |
| 2016/0071144 A1* | 3/2016 | Abedi | G06Q 30/0246 705/14.45 |
| 2016/0196579 A1* | 7/2016 | Koura | G06Q 30/0255 705/14.53 |
| 2016/0210334 A1* | 7/2016 | Prophete | G06F 17/30887 |

OTHER PUBLICATIONS

Oracle Help Center; "Database Application Developer's Guide—Object-Relational Features"; 2015.

LinkForce: A URL Shortener; https://appexchange.salesforce.com/listingDetail?listingId=a0N3000000319j1EAC; last downloaded on Apr. 28, 2015.

Product Tour Bitly Brand Tools; https://bitly.com/pages/tour; last downloaded on Apr. 28, 2015.

* cited by examiner

DEEP LINKING TO APPLICATION OBJECTS

CROSS REFERENCE TO RELATED APPLICATIONS

This application claims priority of Provisional Patent Application Ser. No. 62/188,064, filed on Jul. 2, 2015, the contents of which is hereby incorporated by reference.

FIELD

One embodiment is directed generally to a computer system, and in particular to the selection of application objects in a computer system.

BACKGROUND INFORMATION

Data, services, and other resources are generally identified with a resource identifier such as a uniform resource locator ("URL"). For example, resource identifiers can be used to indicate a network location of Internet web sites, email messages, alerts, application programs, etc. Resource identifiers may also include query strings, settings, and/or other data.

Consequently, resource identifiers can become rather large, and sometimes too large to include in certain types of data elements. For example, known web applications have an associated URL to show a page in a browser. However, application navigation can be quite complex where a very long and complex "full" URL link with a large number of parameters is needed to achieve a direct view to that page (i.e., a deep link to the page). Known web applications can encrypt a complex URL so it is small, referred to as a "deep link." However, with these known applications, the original URL must first be known.

SUMMARY

One embodiment is a system that directs a user to an object. The system, in response to a selection of a deep link uniform resource identifier ("URL") that includes an identity of a web service, an object type and action, accesses a database table. The system uses the object type and the action as a first index key and a second index key of the database table to generate a query. In response to the query, the system retrieves additional parameters to append to the deep link URL to generate a full URL. The system then directs the user to the object that corresponds to the full URL.

DETAILED DESCRIPTION

One embodiment provides "deep linking" by creating a shortened uniform resource locator ("URL") link that will directly bring a user's focus to an individual object of an application. Embodiments provide the ability to link directly to a specific page of an application, rather than navigate from the Home page>work area>do a search and finally get to a page. Embodiments provide deep links for applications such as Oracle Fusion Applications from Oracle Corp., which allow custom objects to be created on the fly. Embodiments can "deep link" to these objects even though the objects may not be known when an application is deployed.

Figure 1:
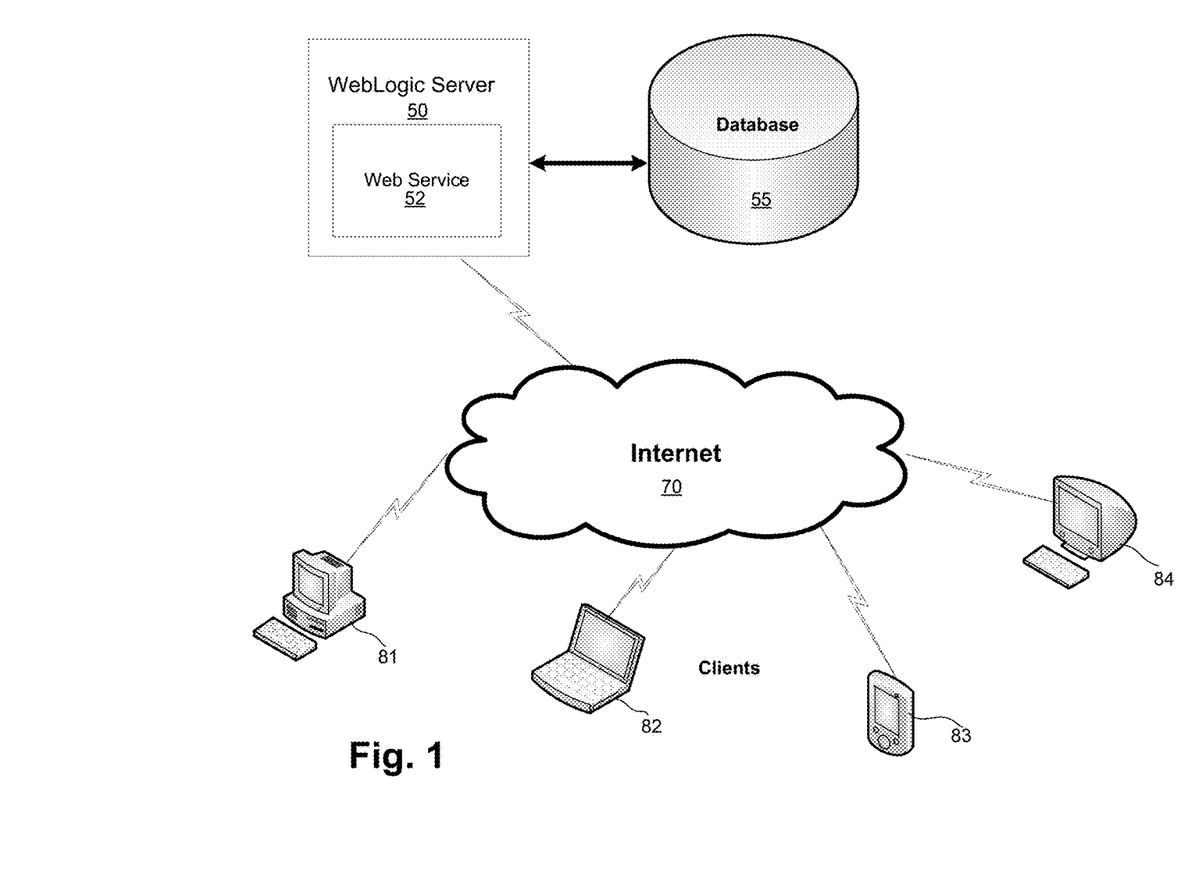
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes client devices 81-84 in communication with a web server 50 over the Internet 70 or any other type of communications network. The client devices may include desktop computers 81, 84, a laptop computer 82, and a smartphone 83. However, any device that can connect to a web site, or other application that utilizes URLs, over a network using a web browser or some other means can be used. Client devices 81-84 and web server 50 may communicate with each other using well-known communication protocols, such as Transmission Control Protocol ("TCP") and Internet Protocol ("IP"), or TCP/IP, HTTP and Extensible Markup Language ("XML").

Client devices 81-84 access a web service 52 (e.g., a deep link web service) that is implemented on web server 50. In one embodiment, web server 50 is a WebLogic Server from Oracle Corp. In other embodiments, other implementations of a web service can be used. Web service 52 accesses a database 55 which stores a deep link table. Each client device 81-84 executes a browser or other functionality to allow a user to select a deep link URL that is selectable on a user interface ("UI"). In response, through the use of a process implemented by web service 50 and disclosed in detail below, the deep link URL is converted into a full URL that is returned to the client.

Figure 2:
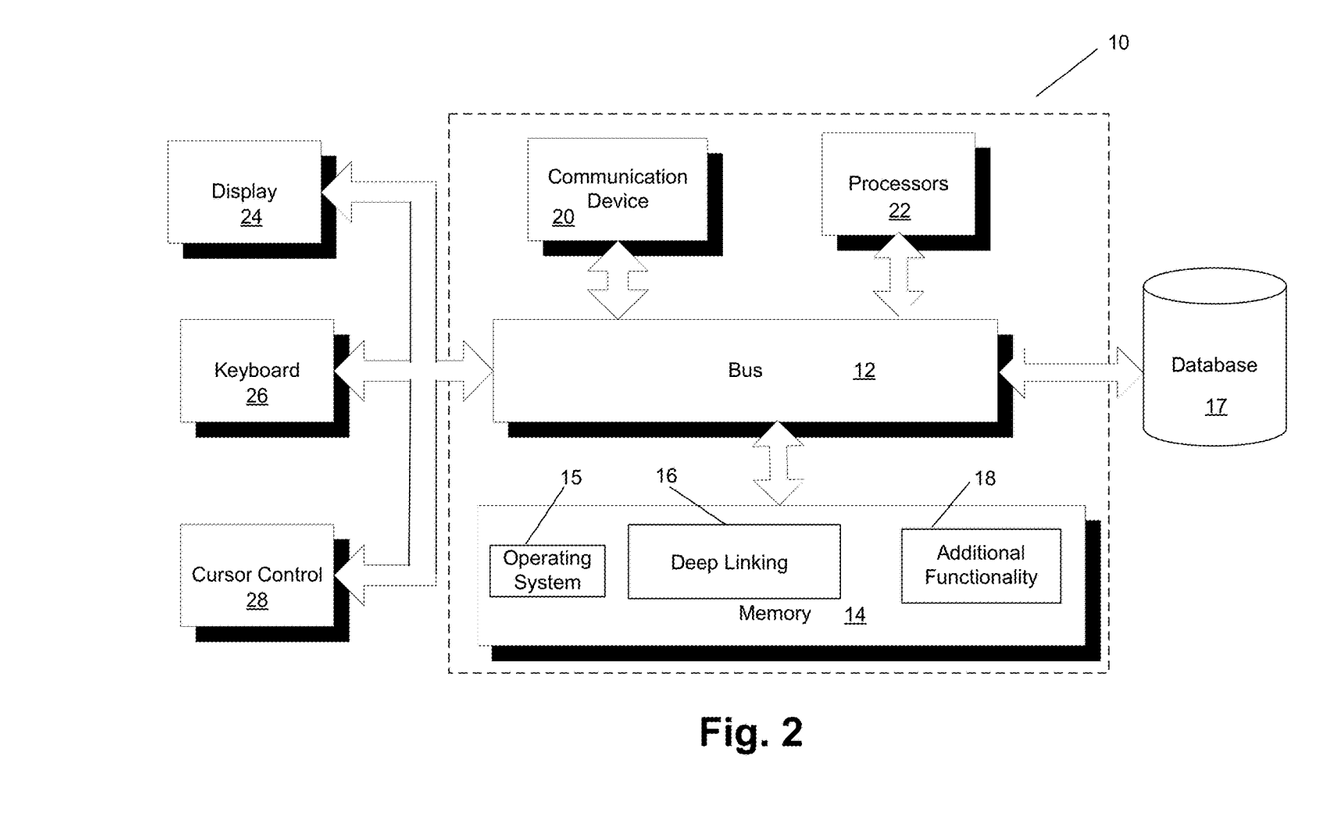
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a client device, system 10 may be a smartphone that includes a processor, memory and a display, but may not include one or more of the other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a deep link module 16 for providing deep linking functionality, and all other functionality disclosed herein. System 10 can be part of a larger system. Therefore, system 10 can include one or more additional functional modules 18 to include the additional functionality, such as an enterprise application that provides the application objects that are directed to by a deep link. A database 17 is coupled to bus 12 to provide centralized storage for modules 16 and 18 and store deep link tables, etc.

As disclosed, embodiments provide "deep linking" for creating a shortened URL link that will directly bring a user's focus to an individual object, page or context. One embodiment is a centralized model for accessing any object based on its name and some key value. Embodiments include a syntax and associated parameters, and can be used for both "Fusion Oracle Application Objects" from Oracle Corp., as well as new objects/resources created using any other application. An application knowledgeable converter can optionally be employed so the parameters can be expressed in the business terms of the everyday usage context. Further, in one embodiment the standard parameter names in the deep links are not case sensitive. This allows flexibility not available in a full URL.

In one embodiment, the linked to objects are "Oracle Fusion Middleware" objects from Oracle Corp. Example of objects include (1) a sales opportunity or sales order object from a customer relationship management ("CRM") application; (2) a customer or person object from a CRM application; (3) a service request object from a CRM application; (4) a Business Process Shipment Escalation object from a business process application; (5) a Portal subject object from a web portal application; (6) a General Ledger Period Close object from a financial/ERP application; (7) an Inventory Item object from an inventory/ERP application; and (8) an Ordered Product object from a distributed order orchestration application (e.g., "Fusion Distributed Order Orchestration (DOO)" application from Oracle Corp.). However, in addition to objects, embodiments can provide deep linking to any web page or any other type of indexed resource.

In embodiments that uses application "objects" from Oracle Corp., the objects are user-defined types that make it possible to model real-world entities such as customers and purchase orders as objects in the database. Oracle object technology is a layer of abstraction built on Oracle relational technology. New object types can be created from any built-in database types and any previously created object types, object references, and collection types. Metadata for user-defined types is stored in a schema that is available to SQL, PL/SQL, Java, and other published interfaces.

Object types and related object-oriented features such as variable-length arrays and nested tables provide higher-level ways to organize and access data in the database. Underneath the object layer, data is still stored in columns and tables, but users are able to work with the data in terms of the real-world entities, such as customers and purchase orders, that make the data meaningful. For example, instead of thinking in terms of columns and tables when a user queries the database, a user can simply select a customer.

In operation, the request for an object/resource in response to a selection of a deep link, in accordance to embodiments, will be forwarded to the actual application which services the particular object. This redirection also allows the links to be technology/UI agnostic so the same link can be used even if the technology and arguments require change. Embodiments can be used when sending links to objects via email notifications or if a user desires to generate a simple URL which can be used as a bookmark. For security purposes, embodiments include a check if the user has access to the page and if not, an error message will be shown and the destination URL will not be shown. Unlike known solutions, embodiments do not require a user to know the original URL to create the deep linked URL.

As one example of the use of embodiments of the invention, a GUI can be displayed that includes a large number of displayed customers. For each customer displayed, it may be desired to create an associated embedded URL link that will direct a user to a customer detail page of a customer relationship management ("CRM") application for the selected customer. Embodiments avoid having to first determine a full URL for each of the customer detail pages and then adding it to the GUI as may be required by known solutions. Embodiments create a link to a UI view of an object regardless of the UI technology. The deep links are not UI dependent, so as applications change, the links will continue to work.

Figure 3:
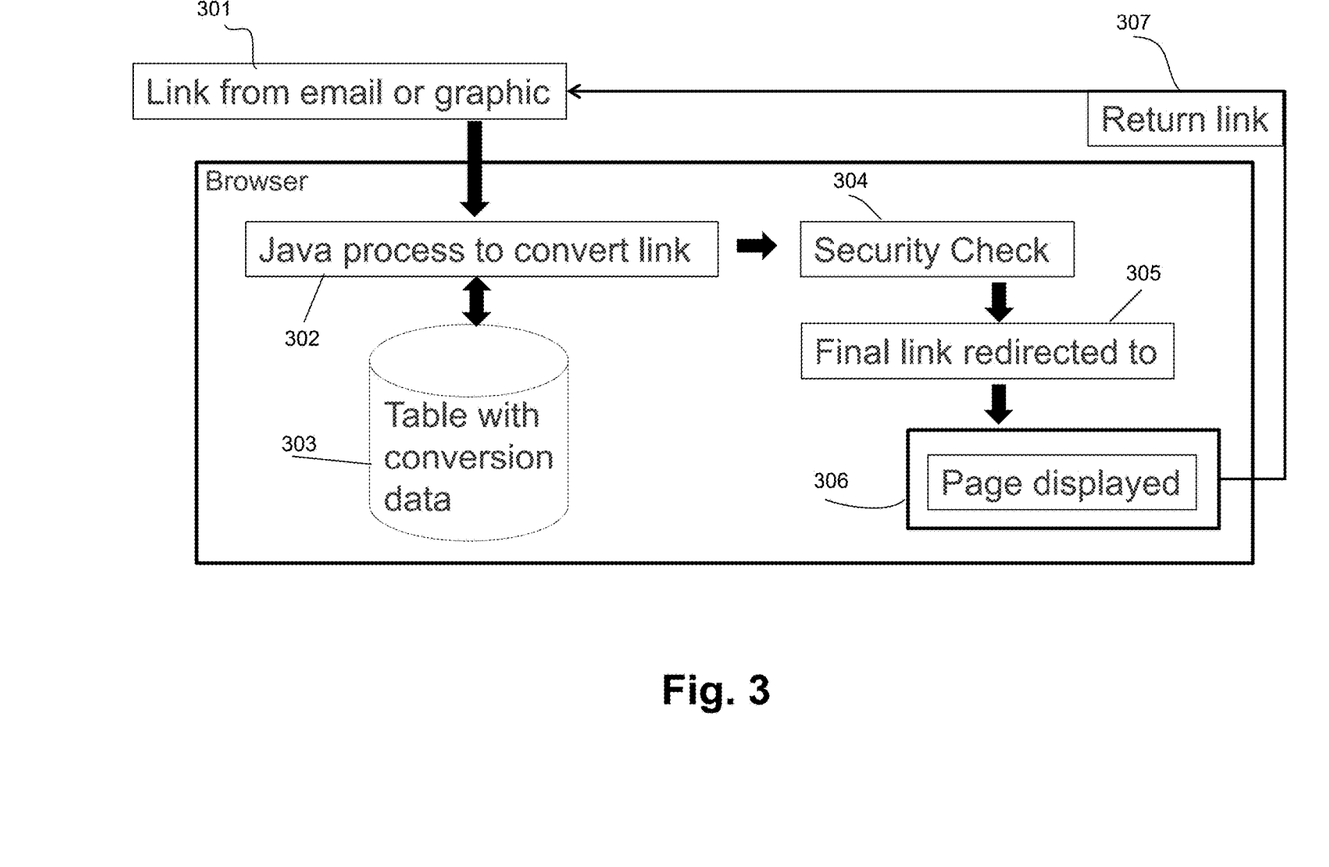
FIG. 3 illustrates a high level overview of deep linking in accordance to embodiments of the invention.

FIG. 3 illustrates a high level overview of deep linking in accordance to embodiments of the invention. Starting at 301, a deep link that is selectable to a user is made available via, for example, an email or a GUI. The link, as described below, is specifically formatted for a specific page (i.e., specific functionality) of an object or other resource.

Once the link is selected, a Java process is invoked at 302 to convert the link. In one embodiment, the Java process is a web service process such as web service 52 of FIG. 1. At 303, a table with conversion data (i.e., data used to convert the deep link to a full URL) is queried. In one embodiment, the table is stored in database 55 of FIG. 1.

At 304, an optional security check, described in more detail below, is performed to determine if the user has access rights to the data/functionality that corresponds to the full URL. If yes, at 305 the final/full URL is redirected to the corresponding object or resource, and consequently the object or resource page is displayed at 306. If the user does not have rights or access to the object/page, the resulting URL is not shown in the browser. Further, at 307, an optional return link is generated and sent to the user. The return link, when selected, sends the user back to the previously viewed web page.

In one embodiment, the UI view of objects are formed from Oracle Application Development Framework ("ADF") task flows. Task flows provide a modular approach for defining control flow in an application. Instead of representing an application as a single large JavaServer Faces ("JSF") page flow, the application is broken up into a collection of reusable task flows. Each task flow contains a portion of the application's navigational graph. The nodes in the task flows are activities. An activity node represents a simple logical operation such as displaying a page, executing application logic, or calling another task flow. The transactions between the activities are referred to as "control flow cases."

Embodiments may include an "action" that is presented to the end user that they can get to an object in the context of a business process and can have the deep link go to a specific point in the life cycle of the business process. Embodiments can also specify to go to an overview page (e.g., a task flow) rather than a specific object, or can specify to go to a tab (e.g., on an overview page) or sub-tab (e.g., on a detailed object page).

In one embodiment, in the formatting/structure of the deep link, the beginning specifies a web service, and then an object type and action. The web service has access to the object type (e.g., person) and action (e.g., edit address of the person) parameters of the deep link. The object type and action are a key index in a "deep link list" database table (e.g., 303 of FIG. 3) that provides the information to be able to construct the full URL. When creating a custom or new object (e.g., a new action type), embodiments will automatically populate the table so deep links are available to the new objects. The table changes dynamically.

As disclosed, the deep link in embodiments can include the name of the web service (e.g., "deeplink"), the object type (or anything that provides a key to the table), and an action (or any other additional key to the table). The deep link further can include an object key (i.e., any number of name value pairs that identify a specific instance of an object), and parameters (i.e., anything that the user wants to pass into the page/task). For example, if the task is to edit a user's profile, the parameters can enable the passing in of a new address that will automatically populate the task UI.

Figure 4:
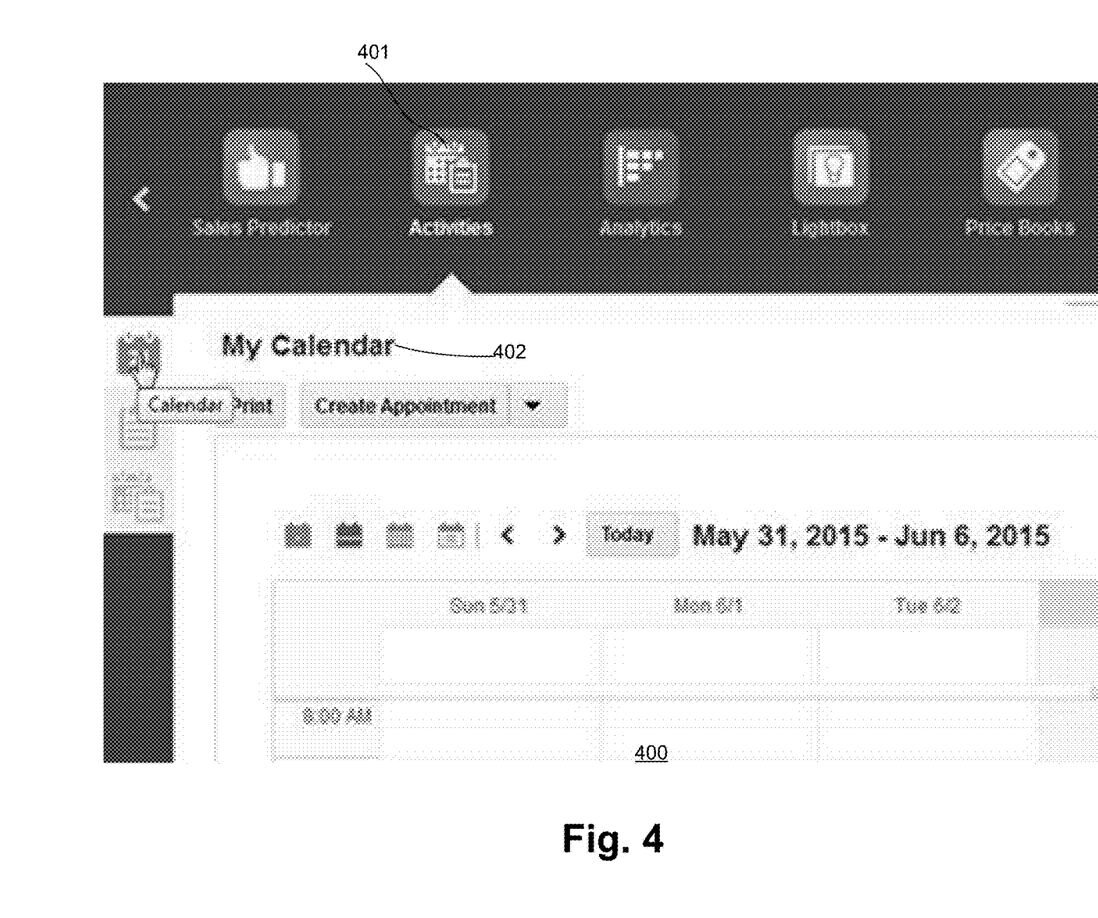
FIG. 4 is a screenshot of an "activities" tab of a calendar application that can be the target of a deep link in accordance with embodiments of the present invention.

FIG. 4 is a screenshot 400 of a "My Tasks" tab 401 of a calendar application 402 that can be the target of a deep link in accordance with embodiments of the present invention. In this example, the format of the deep link is as follows:

```
https://<pod-name>/fndSetup/faces/deeplink?
   objType=<>&
   objKey=<name1=value1;name2=value2...>&
   action=<action value>&
   taskParams=<anything else for task>&
   pageParams=<anything else for page>&
   returnApp=<>&
   returnAppParams=<>
```

In the example of FIG. 4, objType=Activities and action=My Tasks. In another example, the deep link can just specify the card, if tab 401 is the default, as objType=Activities. In another example, if the task takes a view parameter, objType=Activities, action=Calendar and taskParams=display=week. In another embodiment, where calendars of any user can be shown, objType=Activities and action=Calendar, objKey=Person=Bob.Smith.

Figure 5:
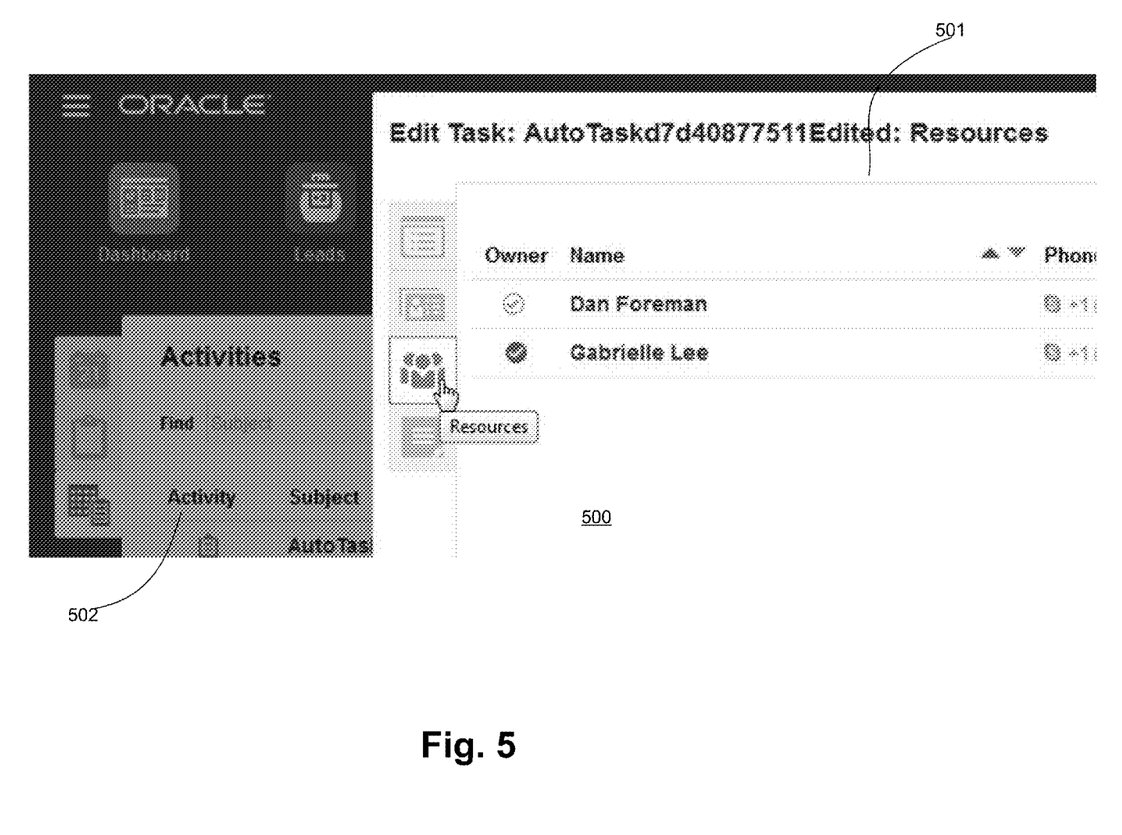
FIG. 5 is a screenshot of an "Edit Task" tab of a customer relationship management ("CRM") application that can be the target of a deep link in accordance with embodiments of the present invention.

FIG. 5 is a screenshot 500 of an "Edit Task" tab 501 of a CRM application that can be the target of a deep link in accordance with embodiments of the present invention. In this example, the format of the deep link is as follows:

```
https://<pod-name>/fndSetup/faces/deeplink?
   objType=<>&
   objKey=<name1=value1;name2=value2...>&
   action=<action value>&
   taskParams=<anything else for task>&
   pageParams=<anything else for page>&
   returnApp=<>&
   returnAppParams=<>
```

In the example of FIG. 5, assume the Activities tab 502 is the default, objType=Activities, objKey=AutoTask=d7d40877511 and taskParams=skipTo=Resources.

Figure 6:
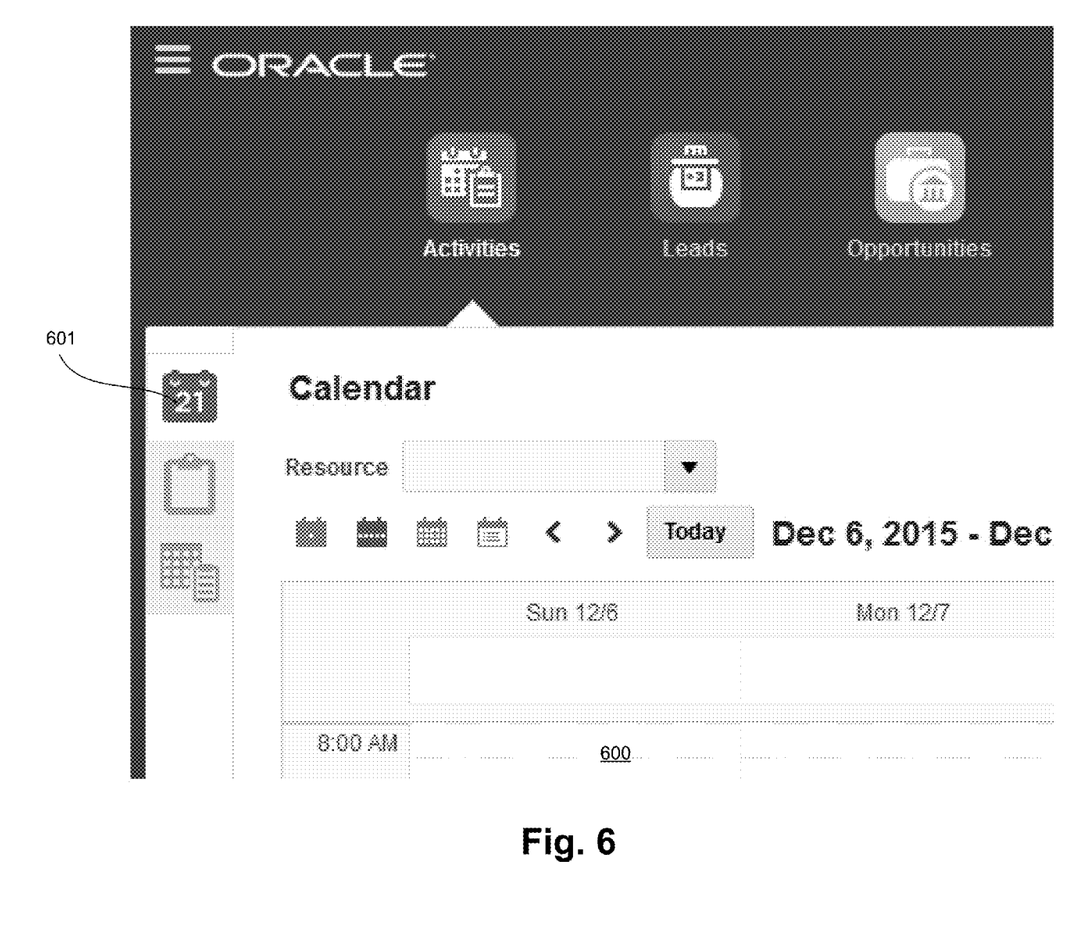
FIG. 6 is a screenshot of an "calendar" tab that can be the target of a deep link in accordance with embodiments of the present invention.

FIG. 6 is a screenshot 600 of an "calendar" tab 601 that can be the target of a deep link in accordance with embodiments of the present invention. FIG. 6 differs from FIG. 4 in that in the example of FIG. 6 the calendar has become a top level object. However, the format of the deep link is the same as for FIG. 4, and the following link can still be used: objType=Activities and action=Calendar. FIG. 6 can also support the following link: objType=Calendar. Therefore, a comparison of FIG. 6 and FIG. 4 illustrates that the links are not tied to the UI. Here, there are different rows in table 303 of FIG. 3, the table with conversion data, where the final URL will be the same. The ultimate object is what determines the deep link.

The web service database table in one embodiment includes columns for: the object type and action (i.e., index keys), a global node ID (i.e., information to get to the correct page), an entry for finding the task (i.e., the task flow, either a task menu or a name of task), task flow parameters (i.e., a catch all), and a task flow converter. The task flow converter, for example, is used if it is desired to pass in employee name "Bob Smith", but the task flow is written to accept an ID instead of employee name. The task flow converter is a Java method that can be registered in one embodiment. The task flow converter takes parameters from the deep link and converts them, and passes them in the full URL. For example, instead of Bob Smith, the task flow converter can look up and pass Employee ID 12345. Another table column can be a Focus view ID for a custom page.

In one embodiment, a selection of a deep link will call a service which will use a table (referred to as "FND_DEEP_LINK_LIST" in one embodiment) with seed information to create full URLs which will be used to navigate to the final UI. The objType and the Action, in combination, forms the index used to choose a specific database table row.

The format of a deep link in one embodiment is:

```
https://<pod-name>/fndSetup/faces/deeplink?
   objType=<>&
   objKey=<name1=value1;name2=value2...>&
   ...
``` where only objType is required in one embodiment. When no objKey is specified, the deep link is expected to go to an Overview or Search page. The objKey will be passed directly to the task flow in the "fnd" parameter, the name of one of the parameters in the long URL, unless a task flow converter is registered. A task flow converter is an application method that will be passed to the objKey and the return value set will then be what is passed to the task flow. When different tasks can be used for viewing the same object, such as detailed tabs, then they all must take the same objKey parameters in one embodiment, or a task flow converter can be used to convert them for specific flows as needed.

The format of a deep link in one embodiment is:

```
https://<pod-name>/fndSetup/faces/deeplink?
...
action=<>&
...
```

For a page with tabs, for the action parameter, in the simplified UI, in one embodiment this will be the name of the top level left hand tab. For example, if the tab name is "Leads" the action is "LEADS". If the tab name is "Sales Campaign" the action is "SALES_CAMPAIGN". This is just one embodiment for ease of discovery of the deep link URL. If the labels change, the deep link URL does not have to change. An additional conversion row could be added with a new label name if desired. For a page with no tabs, for consistency purposes, the name of the heading should be used for action.

For the format of a deep link in one embodiment:

```
https://<pod-name>/fndSetup/faces/deeplink?
...
action=<>&
taskParams=skipTo=<tab_name>;<anything else>&
...
```

In one embodiment, "taskParams" are just passed to the task flow converter if registered, or else they are passed through as part of the fnd parameter. For a sub tab navigation, taskParams will specify any parameters to get to the correct sub tab. Ideally, all applications will use the same parameter for directing to the correct sub tab. For example, all top level tasks would need a "skipTo" parameter. A standard name of this parameter will be established. If used, no conversion is needed. Otherwise, a converter is supplied to change from this parameter name to the one actually used. If all sub tab tasks do not take the same parameters a task flow converter can be created.

The format of a deep link in one embodiment is:

```
https://<pod-name>/fndSetup/faces/deeplink?
...
pageParams=noChrome=true;<anything else>&
...
```

In one embodiment, "pageParams" are just passed through. It is not given to the task flow converter, even if registered. A typical usage when using a deep link to show a Fusion Application within another application would be to pass noChrome=true so there are not two headers shown on a page.

Embodiments further include return parameters, such as shown at 307 of FIG. 3. For example, looking at a graph of employees, a user can click on an employee deep link to go to a task/page, and can then return to the original graph. The return parameters are split into two for security reasons in one embodiment. The return parameters include a "ReturnApp", which is a reference to a URL registered in the topology tables. A topology API is used to lookup the ReturnApp to get the protocol, host, port, and any more of the URL stored there. Therefore, the return URL must be pre-registered, to prevent hackers from redirecting. ReturnApp gets the user to the desired application. The returnAppParams are additional parameters that get the user to the actual graph the user was previously viewing (i.e., a deep link back).

The format of a deep link with returnApp in one embodiment is as follows:

```
https://<pod-name>/fndSetup/faces/deeplink?
...
returnApp=<>&
returnAppParams
```

"returnApp" will be a reference to a URL that is registered in the topology tables. When used, a return icon will appear for the session. If selected, the user will be redirected to the destination. "returnAppParams" will be added to the return URL after a "?". In one embodiment, that uses Oracle Fusion Application, a deeplink can be used return to the application. Here the returnApp will be the webApp (e.g., web service 52 of FIG. 1). "fndSetup". And the returnAppParams must be of the format in one embodiment: "/faces/deeplink?objType=< >&objKey=< > . . . ."

In one embodiment, where the object is a Fusion App, the FND_DEEP_LINK_LIST table is populated as follows:

OBJECT_TYPE * (required): Identifier determined by Fusion Apps to represent the deep link URL.

ACTION* (required):
  A row with action=NONE is mandatory. The standard practice would be that 'NONE' corresponds to an Overview page. If no overview page exists, a search page or an even higher level page is used.
  A row with action=<tab or page header> where the rest of the values are the same as the NONE action. Doing this makes it more flexible in the future where the NONE row can be changed to go to a different task flow without affecting the deep link used by users since they will be told to always supply the action unless they just want to go to a default flow that is allowed to change over time.
  The API to register custom objects will require the action. If the action is not NONE, and a row with NONE does not exist, then a NONE row will also be added.
  Any number of tasks can exist but the number of rows should match the number of top level tabs.
  If no action value is passed in the deep link, it will be interpreted as NONE.
  If action is used in the deep link, but it does not match any action, the NONE row will be used.

GLOBAL_ITEM_NODE_ID * (required): "itemNode" as defined in root_menu.xml of the context flow for the main area within which drill down may be required.

In one embodiment, the context to open can be specified in one of two ways:

TASK_ITEM_NODE_ID: Use the task flow where this value matches the "itemNode" defined in the *_taskmenu.xml. This must be a of context type="defaultMain", else the correct task flow will not load.

TASKFLOW_ID: If TASK_ITEM_NODE_ID is not used, this task flow will be loaded. This task flow will be put into the "fnd=" URL parameter that ApplCore can use for navigation. Format is /WEB-INF/oracle/apps/ . . . /Flow.xml#Flow.

TASKFLOW_PARAMS: These are parameters that will be added to the fnd parameter (added to "fnd="). Use of this makes sense if there is some constant parameters that always get added. These are NOT passed to the task flow converter.

TASKFLOW_LABEL: (Required if using TASK-FLOW_ID) Label to be displayed for the detail context flow. This is displayed in the browser label and also used when have dynamic tabs (i.e., tabs that do not exist in the page until the task is invoked).

TASKFLOW_CONVERTER: Implementation of abstract class DeepLinkTaskflowConverter to generate the context flow parameter list which is required to finally build the "fnd=" URL parameter that ApplCore expects for page navigation. "objKey" of the deep link URL will be one of the inputs. If no implementation is provided and "objKey" is empty, then the assumption is that the context flow expects no input parameters. If no implementation is provided and "objKey" is non-empty, then assumption is that the objKey will be passed directly to the fnd=URL parameter. If nothing needs to be done with the taskParams, the task flow converter still needs to make sure they are passed back.

```
package oracle.apps.fnd.applcore.common;
import java.util.Map;
public abstract class DeepLinkTaskflowConverter {
    public DeepLinkTaskflowConverter( ) { }
        public abstract Map<Object, Object> getTaskFlowParameters (
            String objectType, String action, Map<Object, Object> objectKey,
    String taskParams);
    }
```

FOCUS_VIEW_ID: In one embodiment, this is only used when .jspx is owned that extends the SimpleUIShellPage template instead of relying on FuseOverview.jspx.

In one embodiment, the deep links are supported by a sandbox. The sandbox allows a user to create a new object, and deep links are created in the sandbox to test deep links. The database table will have a column of sandbox names in addition to the other columns. When custom objects are created, they will be deep linkable, but if the custom objects are created in sandboxes, the sandbox name is tracked as well. Rows with sandbox names will only be used when the current user is in that sandbox. Only those rows with matching sandbox names will be used. When the sandbox is published, it will have the sandbox name cleared. If the sandbox is deleted, the row will be removed as well from the database table.

Figure 7:
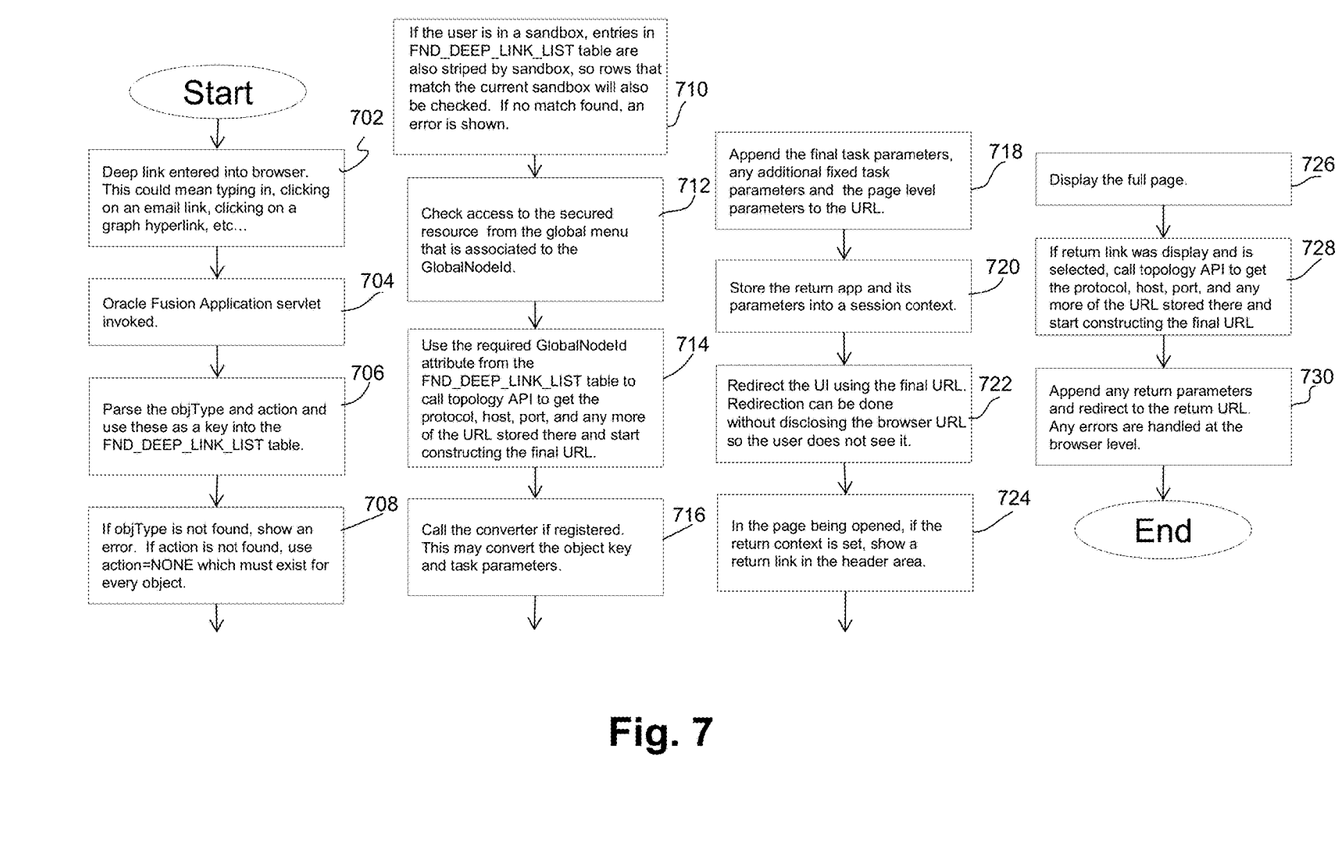
FIG. 7 is a flow diagram of a deep linking module of FIG. 2 when performing deep linking in accordance with embodiments of the present invention.

FIG. 7 is a flow diagram of deep linking module 16 of FIG. 2 when performing deep linking in accordance with embodiments of the present invention. In one embodiment, the functionality of the flow diagram of FIG. 7 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 702, the deep link, generated in a format disclosed above, is entered or selected into a browser or other UI. For example, the deep link can be typed in, selected by clicking on an email link, clicking on a graph hyperlink, etc. In one embodiment, the deep link includes at least an object type ("objType") parameter and an action parameter At 704, an Oracle Fusion Application servlet is invoked in one embodiment. In other embodiments, any type of deep link "translation" functionality can be called.

At 706, the objType and action are parsed and are used as a key into the FND_DEEP_LINK_LIST table, or any other database table that stores the centralized metadata for object access.

At 708, if the objType is not found, an error is shown. If action is not found, action=NONE is used, which exists for every object.

At 710, if the user is in a sandbox, entries in the FND_DEEP_LINK_LIST table are also striped by the sandbox, so that rows that match the current sandbox will also be checked. If no match found, an error is shown.

At 712, access to the secured resource is checked from a global menu that is associated to the GlobalNodeId. The GlobalNodeId is used as an index to information about the page including the resource name to check that the user has access to.

At 714, the required GlobalNodeId attribute from the FND_DEEP_LINK_LIST table is also used to call a topology API to get the protocol, host, port, and any more of the URL stored there and the final URL is begun to be constructed.

At 716, the task flow converter is called if registered. This may convert the object key and task parameters.

At 718, the final task parameters, any additional fixed task parameters and the page level parameters are appended to the URL.

At 720, the return app and its parameters are stored into a session context.

At 722, the UI using the final URL is redirected. The redirection can be done without disclosing the browser URL so the user does not see it.

At 724, in the page being opened, if the return context is set, a return link is shown in the header area or in some other area.

At 726, the full page is displayed.

At 728, if return link was displayed and is selected, the topology API is called to get the protocol, host, port, and any more of the URL stored there and the final URL is begun to be constructed.

At 730, any return parameters are appended and redirect to the return URL. Any errors are handled at the browser level.

As disclosed, embodiments generate deep link URLs that direct a browser or other mechanism to a specific functionality of an application object, or page or functionality. The deep link includes at least an object type and action that function as a key index in a database table that provides information to construct a corresponding full URL. The deep link URL can be created without needing to know the full URL in advance. The deep link redirection also allows the links to be technology/UI agnostic so the same link can be used even if the technology and arguments require change.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to direct a user to an object, the directing the user comprising:
in response to a selection of a deep link uniform resource identifier (URL) that comprises an identity of a web service, an object type and action, accessing a database table;
using the object type and the action as a first index key and a second index key of the database table to generate a query;
in response to the query, retrieving additional parameters to append to the deep link URL to generate a full URL; and
directing the user to the object that corresponds to the full URL.

2. The computer readable medium of claim 1, wherein the object is a page of a task flow.

3. The computer readable medium of claim 1, the directing the user further comprising determining whether the user has security access to the object before directing the user to the object.

4. The computer readable medium of claim 1, wherein the selection of the deep link URL is accessed from a first page, and the directing the user further comprising:
generating a return link to the first page;
displaying the return link on a second page that corresponds to the object.

5. The computer readable medium of claim 1, the directing the user further comprising creating the object in a sandbox.

6. The computer readable medium of claim 2, the directing the user further comprising calling a task flow converter that converts parameters in the deep link and passes the converted parameters to generate the full URL.

7. The computer readable medium of claim 1, wherein the object comprises one of an application object, a web page, or a resource.

8. A computer-implemented method of directing a user to an object, the method comprising:
in response to a selection of a deep link uniform resource identifier (URL) that comprises an identity of a web service, an object type and action, accessing a database table;
using the object type and the action as a first index key and a second index key of the database table to generate a query;
in response to the query, retrieving additional parameters to append to the deep link URL to generate a full URL; and
directing the user to the object that corresponds to the full URL.

9. The method of claim 8, wherein the object is a page of a task flow.

10. The method of claim 8, further comprising determining whether the user has security access to the object before directing the user to the object.

11. The method of claim 8, wherein the selection of the deep link URL is accessed from a first page, further comprising:
generating a return link to the first page;
displaying the return link on a second page that corresponds to the object.

12. The method of claim 8, further comprising creating the object in a sandbox.

13. The method of claim 9, further comprising calling a task flow converter that converts parameters in the deep link and passes the converted parameters to generate the full URL.

14. The method of claim 8, wherein the object comprises one of an application object, a web page, or a resource.

15. A web server comprising:
a processor;
one or more storage devices coupled to the processor that store instructions that when executed by the processor direct a user at a client computer coupled to the web server to an object, and store a table;
wherein the processor, when directing the user, in response to a selection of a deep link uniform resource identifier (URL) that comprises an identity of a web service, an object type and action, accesses a database table;
the processor further:
using the object type and the action as a first index key and a second index key of the database table to generate a query;
in response to the query, retrieving additional parameters to append to the deep link URL to generate a full URL; and
directing the user to the object that corresponds to the full URL.

16. The web server of claim 15, wherein the object is a page of a task flow.

17. The web server of claim 15, the processor further determining whether the user has security access to the object before directing the user to the object.

18. The web server of claim 15, wherein the selection of the deep link URL is accessed from a first page, the processor further:
generating a return link to the first page;
displaying the return link on a second page that corresponds to the object.

19. The web server of claim 16, the processor further calling a task flow converter that converts parameters in the deep link and passes the converted parameters to generate the full URL.

20. The web server of claim 15, wherein the object comprises one of an application object, a web page, or a resource.

* * * * *

UNITED STATES PATENT AND TRADEMARK OFFICE
CERTIFICATE OF CORRECTION

PATENT NO. : 10,042,933 B2
APPLICATION NO. : 14/996625
DATED : August 7, 2018
INVENTOR(S) : Johl et al.

Page 1 of 1

It is certified that error appears in the above-identified patent and that said Letters Patent is hereby corrected as shown below:

In the Specification

In Column 9, Line 64, after "parameter" insert -- . --.

Signed and Sealed this
Fourteenth Day of May, 2019

Andrei Iancu
*Director of the United States Patent and Trademark Office*